Jan. 9, 1962       J. L. KING ETAL       3,016,216
                AERIAL CARGO DELIVERY MEANS
Filed Feb. 23, 1960                    3 Sheets-Sheet 2
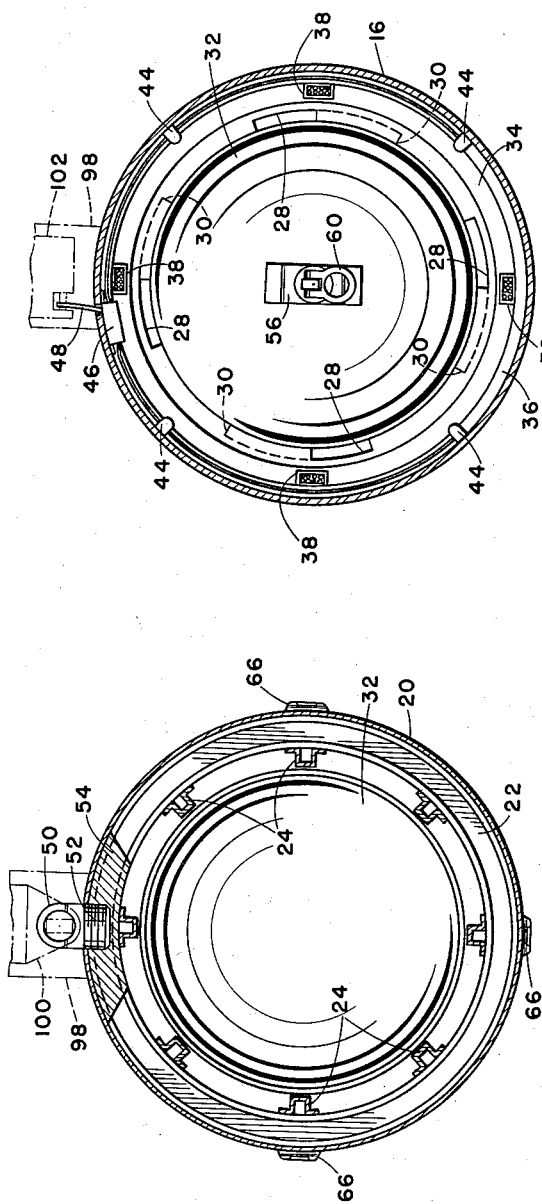
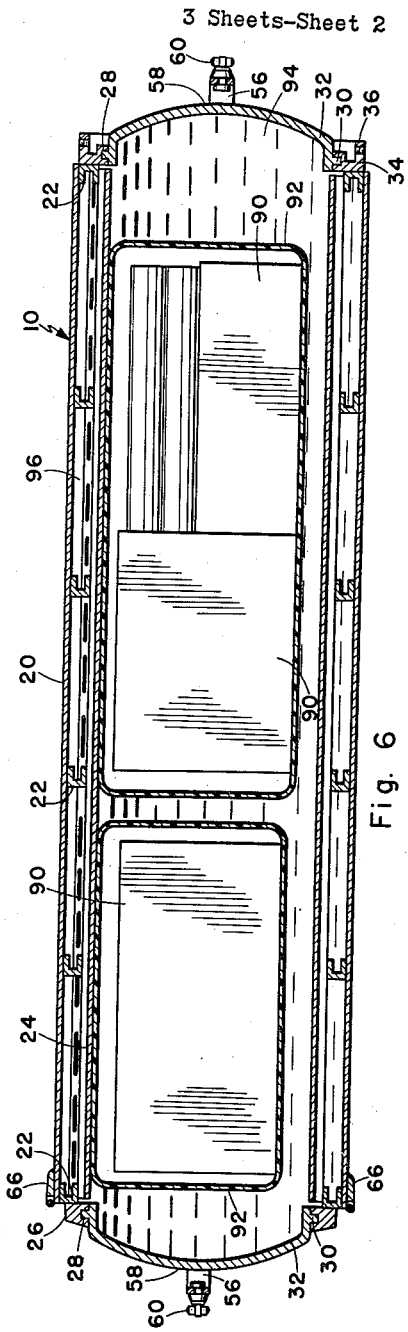
INVENTORS.
JAMES L. KING
REX G. FINNEY
BY Knox & Knox Jan. 9, 1962 　　　J. L. KING ETAL　　　3,016,216
AERIAL CARGO DELIVERY MEANS
Filed Feb. 23, 1960　　　　　　　　　　　　　3 Sheets-Sheet 3
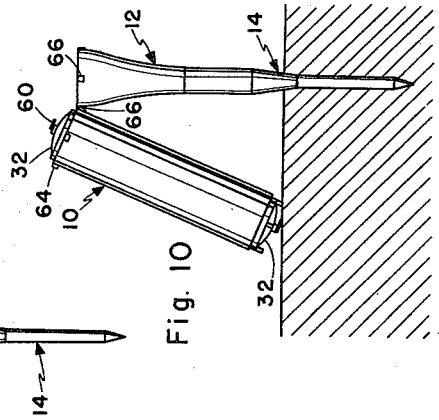
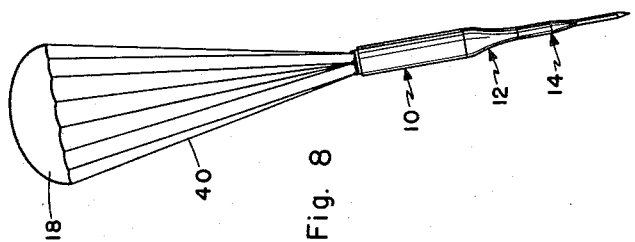
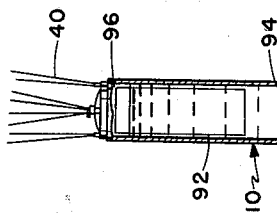
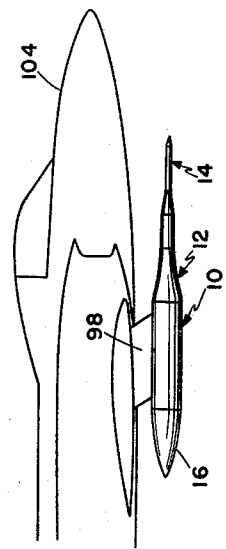
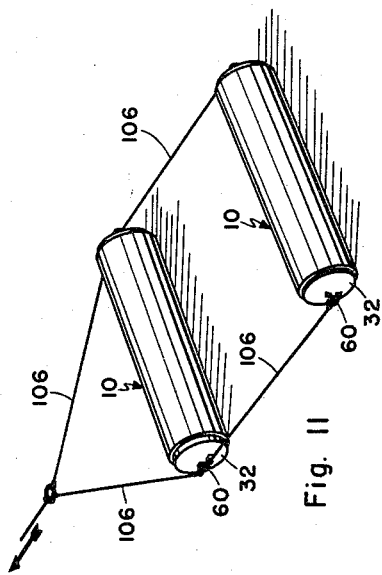
INVENTORS.
JAMES L. KING
REX G. FINNEY
BY
*Knox & Knox*

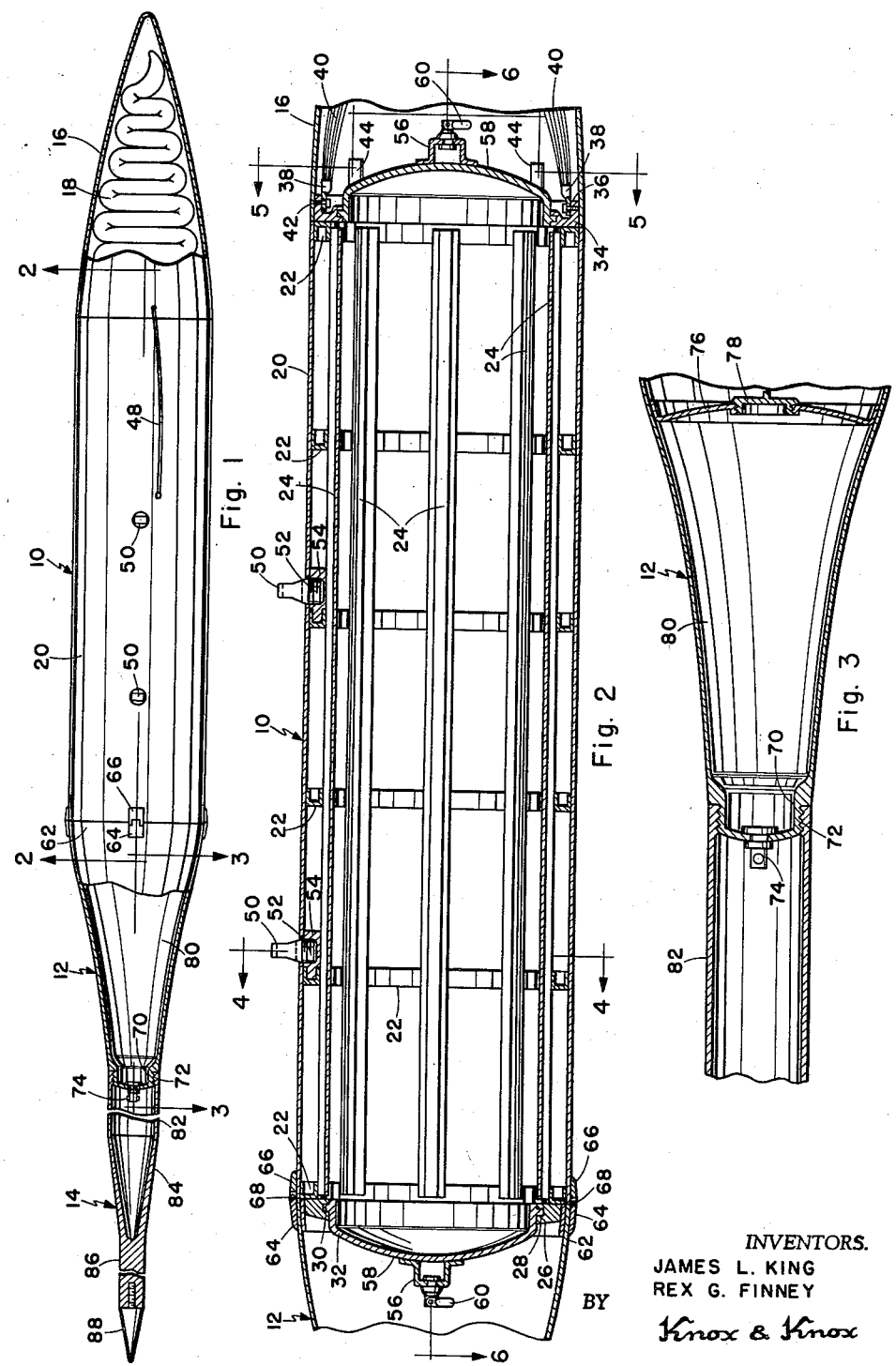

United States Patent Office 3,016,216
Patented Jan. 9, 1962

3,016,216
AERIAL CARGO DELIVERY MEANS
James L. King, Del Mar, and Rex G. Finney, Spring Valley, Calif., assignors to The Ryan Aeronautical Co., San Diego, Calif.
Filed Feb. 23, 1960, Ser. No. 10,423
11 Claims. (Cl. 244—138)

The present invention relates generally to cargo carriers and more particularly to aerial cargo delivery means.

The primary object of this invention is to provide aerial cargo delivery means capable of carrying fragile cargo, which is suspended in buoyant packages in a sealed container for protection against landing impact and movements during delivery.

Another object of this invention is to provide aerial cargo delivery means using a small parachute and having a high rate of descent to reduce free fall time to a minimum and which is supported by a ground penetrating spike in the landed position.

Another object of this invention is to provide aerial cargo delivery means having a cargo container which is easily storable in sealed, packed condition and can be prepared for delivery in a minimum of time.

Still another object of this invention is to provide aerial cargo delivery means in which the cargo container is easily detached after landing and is fitted with towing rings for rolling or towing from the drop area.

A further object of this invention is to provide aerial cargo delivery means having an aerodynamically shaped nose portion which can be used as an additional cargo container, particularly for liquids.

Another object of this invention is to provide aerial cargo delivery means which can be delivered at near sonic speeds and dropped with considerable accuracy from high or low altitudes.

Finally, it is an object to provide aerial cargo delivery means of the aforementioned character which is simple and convenient to use and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

FIGURE 1 is a side elevation view of the complete cargo delivery vehicle, portions being cut away;

FIGURE 2 is an enlarged fragmentary sectional view taken on the line 2—2 of FIGURE 1;

FIGURE 3 is an enlarged fragmentary sectional view taken on the line 3—3 of FIGURE 1;

FIGURE 4 is an enlarged sectional view taken on the line 4—4 of FIGURE 2;

FIGURE 5 is an enlarged sectional view taken on the line 5—5 of FIGURE 2;

FIGURE 6 is a sectional view as taken on the line 6—6 of FIGURE 2, showing the cargo container only, loaded for storage;

FIGURE 7 is a diagrammatic view showing the cargo delivery means suspended from an aircraft;

FIGURE 8 is a diagrammatic view showing the device in free fall with parachute opened;

FIGURE 9 is an enlarged view similar to FIGURE 8, partially cut away to show the buoyant cargo;

FIGURE 10 is a diagrammatic view of the device in landed position with the cargo container partially detached; and FIGURE 11 is a diagrammatic view of a pair of cargo containers coupled for towing.

Similar characters of reference indicate similar or identical elements and portions throughout the specification and throughout the views of the drawings.

The cargo delivery vehicle includes a cargo container 10, a tapered nose portion 12, an elongated ground penetrating spike 14, and a tail fairing 16 which encloses a parachute 18. The cargo container 10 comprises a cylindrical casing 20 having a plurality of longitudinally spaced, internal frames 22 interconnected by stringers 24, the structure being typical of aircraft construction for light weight and maximum strength. It should be understood, however, that the structure is exemplary and the casing may be made without internal bracing, or in any other suitable manner, as long as the structure is fluid tight and preferably substantially cylindrical. Fixed and sealed to the forward end of the casing 20 is a front end ring 26 having a plurality of internal spiral slots 28, to receive the correspondingly spiral tongues 30 of a domed end cap 32. This structure is similar to the conventional interrupted thread of twist-lock fastening and provides for simple attachment or removal of the end cap 32. At the rear end of the casing 20 is a rear end ring 34 which is fixed and sealed to the casing structure, said rear end ring also having internal spiral slots 28 for attachment of a second domed end cap 32. Thus both ends of the casing 20 are closed by the end caps 32 and the connections are close fitting for a fluid tight seal. If necessary, gaskets may be used or a suitable sealing compound applied after the container is loaded.

The rear end ring 34 has an axially extending annular flange 36 to which the parachute 18 is attached by means of end fittings 38 secured to the parachute shroud lines 40, said end fittings being secured to the flange by bolts 42. The parachute 18 is packed in a conventional manner and is enclosed within the tail fairing 16, which is of suitable aerodynamic shape for minimum drag at high speeds, said tail fairing being a close fit over the flange 36 and being attached thereto by explosive connections 44 of any well known type, either pyrotechnic or electrically initiated. The explosive connections 44 are all connected to a timer 46 attached to the rear end ring 34, said timer having an actuating cable 48 which may be coupled to a conventional arming and release mechanism, as will be described hereafter. The tail fairing 16 may be of light construction, such as a molded plastic shell, since the only loads borne by the fairing are the small weight of the parachute 18 and aerodynamic loads.

The cargo container 10 is provided with a pair of longitudinally spaced suspension rings 50, having threaded studs 52 which screw into reinforcing plates 54 in the casing 20. The suspension rings 50 are positioned so that the center of gravity of the complete, loaded assembly falls substantially centrally between the rings, in order to distribute the load properly. The end caps 32 are each fitted with a bracket 56 fixed centrally on the domed portion 58 thereof, each bracket carrying a freely swivelling towing ring 60 or equivalent swivelled tow line attachment means at each end of and disposed axially of the cylindrical casing 20.

The nose portion 12 is of hollow construction, able to withstand considerable axial impact loads and is of smoothly tapered aerodynamic shape for minimum drag. The rear skirt 62 of the nose portion 12 fits over the front end ring 26 and is held in place by four hinges spaced peripherally around the edge thereof, the hinges comprising hinge elements 64 fixed to said skirt and mating hinge elements 66 fixed on the casing 20, the elements being interconnected by removable hinge pins 68. The forward end of the nose portion 12 is closed and has a reduced diameter neck 70 with external screw threads 72, said neck being provided with a valve 74. Inside the nose portion 12, adjacent the skirt 62, is a fixed bulkhead 76 having a removable filler cap 78 therein, said nose portion thus containing an enclosed chamber 80 between said neck 70 and said bulkhead.

The spike 14 includes a tubular portion 82 which is threaded internally to screw onto the neck 70, the outer surface of the tubular portion being smooth and continuous with the nose portion 12. The tubular portion 82 has a tapered forward end 84, extending from which is a reduced diameter solid portion 86 fitted with a ground penetrating point 88.

In loading the cargo container 10, items of cargo, indicated generally at 90 in FIGURE 6, are first enclosed in sealed, air filled envelopes 92 of plastic, rubber, or other fluid tight material. The sealed envelopes 92 are placed in the cargo container 10 which is then filled almost full with liquid 94 to leave a small air pocket 96, the envelopes being buoyant due to the enclosed air. The liquid 94 may be water for convenience and economy, but could be any other liquid such as gasoline, or oil, which would comprise part of the cargo and also serve a useful purpose during delivery. With the end caps 32 tightly in place, the loaded cargo container 10 can be stored for considerable periods, according to the nature of the cargo, the liquid providing protection against deterioration and acting as a cushion when the container is moved.

For delivery, the nose portion 12 and spike 14 are attached to the forward end of the cargo container 10, the parachute 18 and tail fairing 16 being attached to the other end. The assembly is a complete cargo vehicle and is designed to be carried on the conventional type external stores rack of an aircraft, normally used to carry bombs, rockets, or fuel tanks. The suspension rings 50 are held by the existing catches, while the actuating cable 48 is attached to the weapons arming mechanism in the pylon type rack, which is indicated at 98 in FIGURE 7. The catches and arming mechanism are well known and need not be described in detail, but for purposes of illustration are indicated in broken line at 100 and 102 in FIGURES 4 and 5, respectively. It should be understood that other means of releasing the parachute may be used.

The cargo vehicle is carried under the aircraft, indicated at 104, to a predetermined target area and is dropped by conventional bomb release means. When the suspension rings 50 are released from catches 100, the arming mechanism 102 retains the actuating cable 48 and starts the timer 46, in the manner of arming a bomb. After a predetermined interval, the timer 46 initiates the explosive connections 44 which blow the tail fairing 16 off, allowing the parachute 18 to open in the slipstream. The parachute 18 is of the small, drogue type and is not intended to support the cargo vehicle for a slow drop, but rather to act as a stabilizing means and reduce the impact velocity somewhat below that of a free falling body. As an indication, impact velocities of 85 to 90 feet per second are contemplated, although these figures should not be considered limiting. The drop position, with the cargo vehicle suspended below the parachute 18, is illustrated in FIGURES 8 and 9, in which position the cargo envelopes 92 are floating near the top of the cargo container 10, the liquid 94 acting as a cushion under the cargo and the air pocket 96 providing the necessary resiliency to absorb shock.

Upon striking the ground, the spike 14 penetrates and holds the cargo vehicle in a generally upright position, the depth of penetration being dependent on the hardness of the ground. The spike 14 is shaped and dimensioned to provide the most effective deceleration using the frictional resistance of the ground and, in deep penetration of soft ground, the nose portion 12 may also be partially embedded and provides considerable resistance to prevent complete burial.

During impact and deceleration, the cargo is protected by its buoyancy in the liquid filled container 10 and is able to withstand severe treatment. Certain types of cargo carrying devices have heretofore used multiple hydraulic type shock absorbers incorported into the ground engaging nose portions thereof, but such arrangements are complex, heavy and subject to malfunction. By utilizing buoyant cargo suspension, a simple rigid spike can be used, with resultant reductions in weight, cost and maintenance.

Since the cargo vehicle is envisioned as a large structure with considerable capacity, some means is necessary to simplify removal of the cargo container 10 from the spike and nose portion, which may be firmly embedded in the ground. This is accomplished by removing all but one of the hinge pins 68, so that the cargo container 10 can be swung downwardly on the remaining hinge, as in FIGURE 10. The final hinge pin 68 can then be removed and the cargo container lowered to the ground.

The end caps 32 can be quickly removed for immediate access to the cargo, or the cargo container 10 may be towed away in its sealed, loaded condition. This is facilitated by the swivelling towing rings 60 which, since they are mounted on the domed end caps 32, are positioned outwardly of the ends of the cargo container. Thus no special yoke is necessary, the cargo container 10 being towed by ropes or wires, as indicated at 106 in FIGURE 11, which illustrates two cargo containers coupled together. The domed construction of the end caps 32 holds the ropes 106 clear of the cargo container for easy towing and, to improve rolling, the suspension rings 50 can be unscrewed. The cargo container is an effective means of transportation, both in flight and on the ground and the cargo is cushioned at all times.

The cargo vehicle can be used for many purposes, particularly in military supply applications where specific supplies are required urgently at precise locations, perhaps inaccessible by surface transportation. In such instances, food, ammunition, medical supplies, radio and electronic equipment and spares of many types may be carried. In addition, the chamber 80 in the nose portion 12 may be filled with drinking water or even fuel, the valve 74 in the neck 70 facilitating dispensation after unscrewing the spike 14. As an added feature, the neck 70 can be dimensioned to fit the filler opening of a vehicle fuel tank, so that fuel can be poured directly into the tank.

The cargo vehicle is also adaptable for rescue or emergency operations to deliver equipment or supplies at high speed. Many other uses will be apparent and a wide variety of applications can be made without modification to the basic structure as illustrated and described.

Due to the streamlined shape and durable construction of the cargo vehicle, delivery can be made at near sonic speeds and the parachute may be of the type suited for high speed opening to allow release at such speeds. The parachute is of a size to establish a high rate of descent on the order of approximately 90 f.p.s. enabling the cargo vehicle to be dropped with considerable accuracy on a small target area, the drift being minimized even in high winds. For extremely precise delivery, dive bombing technique may be used with low altitude release, the cargo vehicle being particularly adaptable for such a purpose.

The operation of this invention will be clearly comprehended from a consideration of the foregoing description of the mechanical details thereof, taken in connection with the drawing and the above recited objects. It will be obvious that all said objects are amply achieved by this invention.

It is understood that minor variation from the form of the invention disclosed herein may be made without departure from the spirit and scope of the invention, and that the specification and drawings are to be considered as merely illustrative rather than limiting.

We claim:

1. Aerial cargo delivery means, comprising: an elongated, rigid casing having removable end caps secured thereto in sealed relation for holding a quantity of fluid therein, whereby items of cargo may be immersed in the fluid; one end of said casing having a rigid ground penetrating spike; a parachute operatively connected to the other end of said casing; release means operative to release said parachute; said casing having swivelled tow line attachment means disposed axially of and at each end of said casing; said tow line attachment means including freely rotatable towing rings mounted externally on said end caps.

2. Aerial cargo delivery means, comprising: an elongated, rigid casing having removable end caps secured thereto in sealed relation for holding a quantity of fluid therein, whereby items of cargo may be immersed in the fluid; a nose portion attached to one end of said casing; a plurality of circumferentially spaced, selectively detachable hinges interconnecting said nose portion and said casing; said nose portion having a rigid ground penetrating spike; a parachute operatively connected to the other end of said casing; release means operative to release said parachute; said casing having swivelled tow line attachment means disposed axially of and at each end of said casing.

3. Aerial cargo delivery means, comprising: a generally cylindrical, rigid casing having end caps removably secured thereto in fluid tight, sealed relation; a quantity of fluid partially filling said casing; at least one sealed, buoyant, cargo carrying envelope suspended in said fluid; one end of said casing having a rigid ground penetrating spike; a parachute operatively connected to the other end of said casing; release means operative to release said parachute; said casing having swivelled tow line attachment means disposed axially of and at each end of said casing.

4. Aerial cargo delivery means, comprising: a generally cylindrical, rigid casing having end caps removably secured thereto in fluid tight, sealed relation; said end caps having outwardly domed portions; a quantity of fluid partially filling said casing; at least one sealed, buoyant, cargo carrying envelope suspended in said fluid; one end of said casing having a rigid ground penetrating spike; a parachute operatively connected to the other end of said casing; release means operative to release said parachute; said casing having swivelled tow line attachment means disposed axially of and at each end of said casing; said tow line attachment means including freely rotatable towing rings mounted on said domed portions.

5. Aerial cargo delivery means, comprising: a generally cylindrical, rigid casing having end caps removably secured thereto in fluid tight, sealed relation; said end caps having outwardly domed portions; a quantity of fluid partially filling said casing; at least one sealed, buoyant, cargo carrying envelope suspended in said fluid; one end of said casing having a rigid ground penetrating spike; a plurality of circumferentially spaced hinges interconnecting said nose portion and said casing; said hinges having selectively removable hinge pins; a parachute operatively connected to the other end of said casing; release means operative to release said parachute; said casing having swivelled tow line attachment means disposed axially of and at each end of said casing; said tow line attachment means including freely rotatable towing rings mounted on said domed portions.

6. Aerial cargo delivery means, comprising: a generally cylindrical, rigid casing having end caps removably secured thereto in fluid tight, sealed relation; said end caps having outwardly domed portions; a quantity of fluid partially filling said casing; at least one sealed, buoyant, cargo carrying envelope suspended in said fluid; a nose portion on one end of said casing having a rigid ground penetrating spike; a plurality of circumferentially spaced hinges interconnecting said nose portion and said casing; said hinges having selectively removable hinge pins; said nose portion having a fluid carrying chamber therein adjacent said casing; a parachute operatively connected to the other end of said casing; release means operative to release said parachute; said casing having swivelled tow line attachment means disposed axially of and at each end of said casing; said tow line attachment means including freely rotatable towing rings mounted on said domed portions.

7. Aerial cargo delivery means, comprising: a generally cylindrical, rigid casing having end caps removably secured thereto in fluid tight, sealed relation; said end caps having outwardly domed portions; a quantity of fluid partially filling said casing; at least one sealed, buoyant, cargo carrying envelope suspended in said fluid; a nose portion on one end of said casing having a rigid ground penetrating spike; a plurality of circumferentially spaced hinges interconnecting said nose portion and said casing; said hinges having selectively removable hinge pins; said nose portion having a fluid carrying chamber therein adjacent said casing; the part of said nose portion containing said chamber having a reduced diameter forward end; said ground penetrating spike being detachably secured to said forward end; a parachute operatively connected to the other end of said casing; release means operative to release said parachute; said casing having swivelled tow line attachment means disposed axially of and at each end of said casing; said tow line attachment means including freely rotatable towing rings mounted on said domed portions.

8. Aerial cargo delivery means, comprising: a generally rigid, cylindrical partially fluid filled cargo casing; said casing having removable end caps; freely rotatable towing rings mounted on said end caps and disposed outwardly substantially beyond the ends of said casing and axially thereof; one end of said casing having a rigid ground penetrating spike; a parachute operatively connected to the other end of said casing; release means operative to release said parachute; said casing having swivelled tow line attachment means disposed axially of and at each end of said casing; and at least one sealed, buoyant cargo carrying envelope suspended in said casing.

9. Aerial cargo delivery means, comprising: a rigid, generally cylindrical partially fluid filled cargo casing; said casing having removable end caps; freely rotatable towing rings mounted on said end caps and disposed outwardly substantially beyond the ends of said casing and axially thereof; one end of said casing having an axially projecting end ring; an elongated, tapered nose portion attached to said casing; said nose portion having a skirt fitting closely over said end ring; a plurality of circumferentially spaced hinges interconnecting said casing and said nose portion; said hinges having selectively removable hinge pins; said nose portion having an axially extending, rigid ground penetrating spike; a parachute operatively connected to the other end of said casing; a tail fairing mounted on said casing and enclosing said parachute; release means coupled to said tail fairing operative to release said tail fairing and expose said parachute.

10. Aerial cargo delivery means according to claim 9, wherein said nose portion, said casing and said tail fairing together constitute a smoothly shaped areodynamic structure adapted for external mounting on a high speed aircraft.

11. Aerial cargo delivery means according to claim 3, wherein said parachute is of a size to establish the vertical sinking speed of the parachute supported structure approximately at 90 f.p.s., damage to the cargo being avoided due to the buoyancy thereof in fluid.

References Cited in the file of this patent

UNITED STATES PATENTS

| | | |
|---|---|---|
| 2,439,236 | Brown et al. | Apr. 6, 1948 |
| 2,713,467 | Schreiber | July 19, 1955 |
| 2,759,693 | Gross | Aug. 21, 1956 |
| 2,776,808 | Vonderahe | Jan. 8, 1957 |

FOREIGN PATENTS

| | | |
|---|---|---|
| 1,014,927 | France | June 25, 1952 |

OTHER REFERENCES

"Flight" magazine, page 624, May 18, 1956.